(12) United States Patent
Dolfi

(10) Patent No.: US 8,259,068 B2
(45) Date of Patent: Sep. 4, 2012

(54) LIGHT BEAM SHAPING ELEMENT FOR AN OPTICAL NAVIGATION INPUT DEVICE

(75) Inventor: David Wayne Dolfi, Los Altos, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 665 days.

(21) Appl. No.: 12/391,439

(22) Filed: Feb. 24, 2009

(65) Prior Publication Data

US 2010/0214224 A1 Aug. 26, 2010

(51) Int. Cl.
*G06F 3/033* (2006.01)
(52) U.S. Cl. ........................................ 345/166
(58) Field of Classification Search .................. 345/166
See application file for complete search history.

(56) References Cited

U.S. PATENT DOCUMENTS

| | | | |
|---|---|---|---|
| 7,110,171 B2 | 9/2006 | Dane et al. | |
| 7,173,686 B2 | 2/2007 | Gruhlke et al. | |
| 7,295,504 B2 | 11/2007 | Kitazawa et al. | |
| 7,358,958 B2 | 4/2008 | Welch et al. | |
| 7,418,016 B2 | 8/2008 | Gruhlke et al. | |
| 7,746,477 B1 * | 6/2010 | Huber et al. | 356/498 |
| 2008/0231600 A1 * | 9/2008 | Smith | 345/166 |

* cited by examiner

*Primary Examiner* — Adam R Giesy

(57) ABSTRACT

An optical navigation input device with a light guide which acts as a beam shaping element. The optical navigation input device includes a light source and the light guide. The light source emits a light beam having a substantially elliptical or substantially circular cross section. The light guide is positioned relative to the light source to receive the light beam from the light source in a first direction. The light guide also redirects the light beam in a second direction toward an illumination surface at a non-zero angle of incidence. The light guide directs the light beam through a refraction interface in order to illuminate a substantially circular area on the illumination surface.

14 Claims, 7 Drawing Sheets

LIGHT BEAM SHAPING ELEMENT FOR AN OPTICAL NAVIGATION INPUT DEVICE

BACKGROUND

There is a relatively new class of optical mice and other optical navigation input devices for computing applications. These optical devices facilitate tracking input movements on specular navigation surfaces such as glass tabletops which do not have substantial texture for imaging. In general, these optical navigation input devices rely on light scattered by small particles and scratches. This scattered light slightly increases the angular range of the otherwise collimated specular reflection off the glass surface. By capturing the scattered light off axis of the reflected beam using an offset imaging aperture (i.e., the imaging aperture is offset relative to the main intensity of the specular reflection of the incident light), images of such scattering sites can be projected on a pixel array in a sensor, which can then be used to determine the motion of the mouse relative to the tabletop.

In the process of tracking on a very smooth surface with relatively few features, scattered light from such features is typically collected near the angle of specular reflection of the optical beam used to probe the surface. However, the scattering from a very smooth surface falls off rapidly in relation to a distance from the specular reflection. Hence, the scattered light is in close proximity to the specularly reflected beam in the plane of the imaging aperture of the optical system. However, the specularly reflected beam is usually much brighter (i.e., has a higher intensity) than the scattered light which is used to create the optical images. So an illumination aperture may be used to adjust the outer intensity profile of the incident light beam at an appropriate radius from the center of the light beam. This adjustment helps to avoid having the peripheral portions of the intensity profile of the specularly reflected light beam incur upon the imaging aperture and create excessive noise for the scattered light beam.

Typical laser beams leave the collimating optics of the optical system with a circular cross section at some angle of incidence relative to the navigation surface. Since the cross section of the incident laser beam is circular, the resulting shape of the light beam on the navigation surface is elliptical, depending on the angle of incidence of the light beam. The eccentricity of the elliptical shape is based on the following equation:

$$e = \frac{1}{\cos(q_{inc})}$$

where e is the eccentricity, and $q_{inc}$ is the angle of incidence of the incident light beam.

FIG. 1 shows one example of a relationship between the circular cross section of the incident light beam and the elliptical shape of the illuminated spot on the navigation surface. In particular, the circular cross section of the light beam is indicated at plane A, where the circular cross section has a constant radius, r. In contrast, the elliptical shape of the light beam is indicated at plane B, which is parallel to the navigation surface and at an angle relative to plane A. The elliptical projection has two different dimensions, a and b, along corresponding major and minor axes. Although the b-dimension of the elliptical shape at plane B may be the same as the r-dimension of the circular cross section at plane A, the a-dimension of the elliptical shape is greater than the r-dimension of the circular cross section because of the angle between planes A and B. Similar elliptical shapes result at the illumination and imaging apertures, as well as the image sensor, if these devices are oriented substantially parallel to the navigation surface.

Since the shape of the light beam is elliptical in a plane parallel to the navigation surface, it can be difficult to aperture and/or generate an image of the light beam. One conventional solution is to tilt the apertures and image sensor to correlate to the angle of incidence of the light beam. However, this approach typically results in sophisticated and costly packaging and alignment because of the precision with which the light beam is tailored to achieve proper truncation. In addition, the elliptical shape of the beam at the imaging aperture makes it difficult to place the specularly reflected light beam in close proximity to the imaging aperture without encroaching on the imaging aperture. Also, conventional collimators generally involve input and output optical lens surfaces, which result in multiple reflections within the collimator. These multiple reflections can lead to a scattered "halo" of light around the main beam, which can also encroach on the imaging aperture and, hence, result in further noise problems.

SUMMARY

Embodiments of an optical navigation input device are described. In one embodiment, the optical navigation input device includes a light guide which acts as a beam shaping element. The optical navigation input device includes a light source and the light guide. The light source emits a light beam having a substantially elliptical or substantially circular cross section. The light guide is positioned relative to the light source to receive the light beam from the light source in a first direction. The light guide also redirects the light in a second direction toward an illumination surface at a non-zero angle of incidence. The light guide directs the light beam through a refraction interface in order to illuminate a substantially circular area on the illumination surface. Other embodiments of the optical navigation input device are also described.

In another embodiment, the light guide includes a light input interface, a reflection surface, and a refraction interface. The light input interface receives an incident light beam from a light source in a first direction. The incident light beam has a substantially elliptical or substantially circular cross section taken along a plane substantially perpendicular to the first direction. The reflection surface internally reflects the incident light beam from the first direction to an intermediate direction within the light guide. The refraction interface receives the reflected light beam from the reflection surface and refracts the light beam out of the light guide in a second direction. The second direction is at a non-zero angle of incidence relative to a surface normal of a reference plane. In some embodiments, the reference plane corresponds to an illumination surface. An angled projection, taken along a plane substantially parallel to the reference plane, of the refracted light beam has the same shape as the cross section of the incident light beam. Other embodiments of the light guide are also described.

Embodiments of a method are also described. In one embodiment, the method is a method for operating an optical navigation input device. An embodiment of the method includes emitting a light beam having a substantially elliptical or substantially circular cross section toward a light guide interposed between a light source and an illumination surface. The method also includes directing the light beam through the light guide toward a refraction interface. The refraction interface refracts the light toward the illumination surface at a non-zero angle of incidence relative to a surface normal of the illumination surface. The method also includes modifying the cross section of the light beam at the refraction interface to illuminate a substantially circular spot on the illumination surface. Other embodiments of the method are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

While many embodiments are described herein, at least some of the described embodiments utilize a light guide to generate a circular light beam pattern on an illumination surface. More specifically, the light guide is positioned to facilitate the horizontal orientation of an illumination aperture to reduce package complexity. The circular light beam pattern, generated by the light guide through application of reflection and refraction angles, provides a precision greater than that of conventional optical navigation input systems. The circular light beam pattern also allows the imaging lens to be placed closer in angle to the direction of the specular reflection than is typical with an elliptical light beam pattern. This allows reduction of the overall package size. In addition, on smooth surfaces such as glass, where the amount of light scattered from the surface falls off rapidly as one moves away from the direction of specular reflection, this allows collection by the lens of scattered light closer to this direction, increasing the signal intensity.

Embodiments of the optical navigation input device may be implemented in laser mice or other optical navigation input devices. In particular, embodiments of the light guide may be used in compact optical navigation input devices to track movements on glass or other smooth surfaces. Compared with conventional tracking technologies for smooth surfaces, the substantially circular pattern of the light beam (when viewed in a plane parallel to an illumination surface) directed from the light guide facilitates placement of the imaging aperture closer to the specularly reflected light beam without incursion into the light beam.

Figure 2:
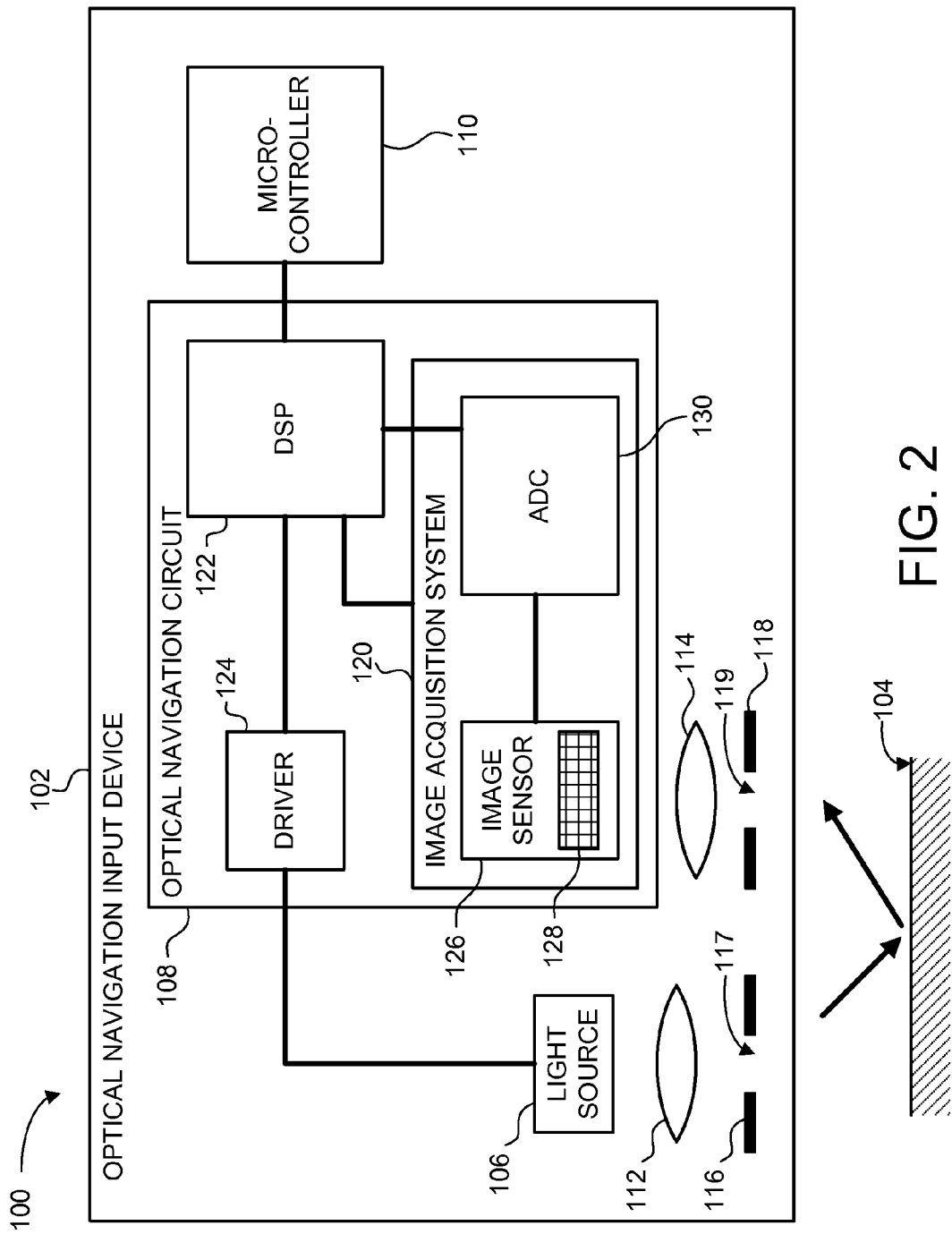
FIG. 2 depicts a schematic block diagram of one embodiment of an optical navigation system.

FIG. 2 depicts a schematic block diagram of one embodiment of an optical navigation system 100. The illustrated optical navigation system 100 includes an optical navigation input device 102 relative to an illumination surface 104. In general, the optical navigation input device 102 illuminates portions of the illumination surface 104 in order to generate images of the illuminated portions or features at the illumination surface 104. More specifically, the optical navigation input device 120 moves relative to the illumination surface 104 and generates one or more navigation signals representative of the movement of the optical navigation input device 102 relative to the illumination surface 104. Hence, the illumination surface 104 also may be referred to as a navigation surface. Additionally, since the illumination surface 104 is used to track the movement of the optical navigation input device 102, the illumination surface 104 also may be referred to as a tracking surface.

In order to illuminate the illumination surface 104, the optical navigation input device 102 emits a light beam which is at least partially reflected by the illumination surface 104. The optical navigation device 102 detects the reflected or scattered light from the surface and processes the light to generate the navigation signals. Examples of how the navigation signals may be generated are described in more detail below.

The illumination surface 104 may be any type of surface and may include one or more types of material compositions. Examples of typical illumination surfaces 104 include wood, stone, or plastic laminate desktops, as well as fabric or other textured navigation pads (e.g., a mouse pad). Some types of illumination surfaces 104 are highly specular so that substantially all of the light incident on the illumination surface 104 is specularly reflected and not diffusely scattered in other directions. One example of a highly specular illumination surface 104 is a glass surface (refer to FIG. 3). Other embodiments may include other types of specular illumination surfaces.

The distance between the optical navigation input device 102 and the illumination surface 104 may vary depending on the application for which the optical navigation input device 102 is used. In surface navigation applications, the optical navigation input device 102 may be relatively close to the illumination surface 104. For example, a housing of the optical navigation input device 102 may be in direct, physical contact with the illumination surface 104. Alternatively, stand-off structures (not shown) attached to the housing of the optical navigation input device 102 may be in direct, physical contact with the illumination surface 104. In other embodiments, the optical navigation input device 102 may be within a few centimeters or inches of the illumination surface 104, without being in direct, physical contact with the illumination surface 104. In contrast, in free space navigation applications, the optical navigation input device 102 may be relatively far from the illumination surface 104. For example, the optical navigation input device 102 may operate outside of the surface navigation optical range.

The depicted optical navigation input device 102 includes a light source 106, an optical navigation circuit 108, and a microcontroller 110. The optical navigation input device 102 also includes optical elements 112 and 114, an illumination aperture structure 116 which defines an illumination aperture 117, and an imaging aperture structure 118 which defines and imaging aperture 119. Other embodiments may include fewer or more components. For example, some embodiments of the optical navigation input device 102 may exclude one or more of the optical elements 112 and 114.

In one embodiment, the light source 106 is a laser. For example, the light source 106 may be a vertical cavity surface emitting laser (VCSEL). Alternatively, the light source 106 may be another type of laser or other light source.

Figure 2A:
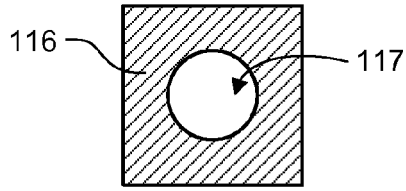
FIG. 2A depicts one embodiment of the illumination aperture structure of FIG. 2, which defines the illumination aperture having a circular shape.
Figure 2B:
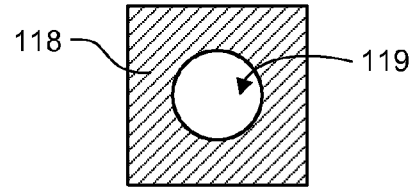
FIG. 2B depicts one embodiment of the imaging aperture structure of FIG. 2, which defines the imaging aperture having a circular shape.

In general, the light source directs a light beam toward the illumination surface 104 to illuminate a primary illumination spot at the illumination surface 104. If the illumination surface 104 is substantially specular, then the light beam reflects off of the illumination surface 104 along a specular reflection path. The incident light beam (i.e., the light traveling toward the illumination surface 104) may pass through the optical element 112 and the illumination aperture 117 formed by the illumination aperture structure 116. FIG. 2A depicts one embodiment of the illumination aperture structure 116 of FIG. 2, which defines the illumination aperture 117 having a circular shape. Similarly, light from the illumination surface 104 may pass through the imaging aperture 119, formed by the imaging aperture structure 118. FIG. 2B depicts one embodiment of the imaging aperture structure 118 of FIG. 2, which defines the imaging aperture 119 having a circular shape. The light that passes through the imaging aperture 119 then passes through the optical element 114. Specific functionality of the optical elements 112 and 114 and apertures 117 and 118 is described in more detail below with regard to FIG. 3.

If there are any surface features such as dust or scratches at the illumination surface 102, then some of the incident light may be scattered along one or more scattered light paths which are offset from the specular reflection path. Essentially, any path which is not the specular reflection path may be considered a scattered (non-specular) light path. In the case of diffuse reflection off of a surface feature, the light may be diffused, or scattered in substantially all directions. Although there may be many types of surface features which scatter the incident light in different directions, some examples of surface features include particles (e.g., dust) on the illumination surface 104, defects (e.g., scratches) in the illumination surface 104, as well as imperfections below or beneath the illumination surface 104.

The depicted optical navigation circuit 108 includes an image acquisition system (IAS) 120, a digital signal processor (DSP) 122, and a driver 124. In one embodiment, the driver 124 of the optical navigation circuit 108 controls the operation of the light source 106 (e.g., using a driver signal) to generate the light beam that is emitted toward the illumination surface 104. As described above, the reflected or scattered light beam, or a portion thereof, is then received by the image acquisition system 120.

The depicted image acquisition system 120 includes an image sensor 126 and an analog-to-digital converter (ADC) 130. The image sensor 126 includes a pixel array 128 of distinct photosensors, or photodetectors. Each photosensor is referred to as a picture element (pixel). As an example, the image sensor 126 may include a 16×16 or 32×32 array of distinct photodetectors configured to detect light that is reflected from the illumination surface 104. In one embodiment, the navigation sensor 126 generates a plurality of electrical signals corresponding to light intensity of the light incident on the pixel array 128. Each of the electrical signals corresponds to one of the picture elements (or pixels) of the pixel array 128. At least a portion of the light beam scattered by a surface feature of the illumination surface 104 is incident on the pixel array 128. In one embodiment, the optical element 114 facilitates resolution of microscopic surface images at the pixel array 128. Alternatively, the optical element 114 facilitates resolution of more distant objects in a free space navigation environment.

The analog-to-digital converter (ADC) 130 converts the plurality of electrical signals, received from the pixel array 128 of the navigation sensor 126, from analog signals to digital signals (e.g., 8-bit digital values). The analog-to-digital converter 130 then passes the digital signals to the digital signal processor 122. After the digital signal processor 122 receives the digital form of the electrical signals from the analog-to-digital converter 130 of the image acquisition system 120, the digital signal processor 122 may perform additional processing using the digital signals.

Image information is captured by the pixel array 128 of the image sensor 126 in sensor-specific frames. A frame of image information includes a set of simultaneously captured values for each distinct photosensor in the pixel array 128. Image frames captured by the pixel array 128 include data that represents features on the illumination surface 104. The rate of image frame capture and tracking resolution can be programmable. In an embodiment, the image frame capture rate ranges up to 2,300 frames per second with a resolution of 800 counts per inch (cpi). Although some examples of frame capture rates and resolutions are provided, different frame capture rates and resolutions are contemplated.

A tracking engine (not shown) within the digital signal processor 122 compares successive image frames from the pixel array 128 to determine the movement of image features between frames. In particular, the tracking engine determines movement by correlating common features that exist in successive image frames generated by the pixel array 128. The movement between image frames is expressed in terms of movement vectors in, for example, X and Y directions (e.g., $\Delta x$ and $\Delta y$) parallel to the illumination surface 104. The movement vectors are then used to determine the movement of the optical mouse relative to the navigation surface. More detailed descriptions of examples of navigation sensor movement tracking techniques are provided in U.S. Pat. No. 5,644,139, entitled NAVIGATION TECHNIQUE FOR DETECTING MOVEMENT OF NAVIGATION SENSORS RELATIVE TO AN OBJECT, and U.S. Pat. No. 6,222,174, entitled METHOD OF CORRELATING IMMEDIATELY ACQUIRED AND PREVIOUSLY STORED FEATURE INFORMATION FOR MOTION SENSING, both of which are incorporated by reference herein.

The digital signal processor 122 then transmits one or more signals to the microcontroller 110. Examples of types of signals transmitted from the digital signal processor 122 of the optical navigation circuit 108 to the microcontroller 110 include channel quadrature signals based on $\Delta x$ and $\Delta y$ relative displacement values. These signals, or other signals, may be indicative of a movement of the optical navigation input device 102 relative to the illumination surface 104.

Alternatively, the quadrature or other signals may be indicative of a movement of the optical navigation input device 102 relative to a distant object or surface in a free space navigation environment. Other embodiments of the digital signal processor 122 may transmit other types of signals to the microcontroller 110. In one embodiment, the microcontroller 110 implements a variety of functions, including transmitting data to and receiving data from a host computer system (not shown).

Figure 3:
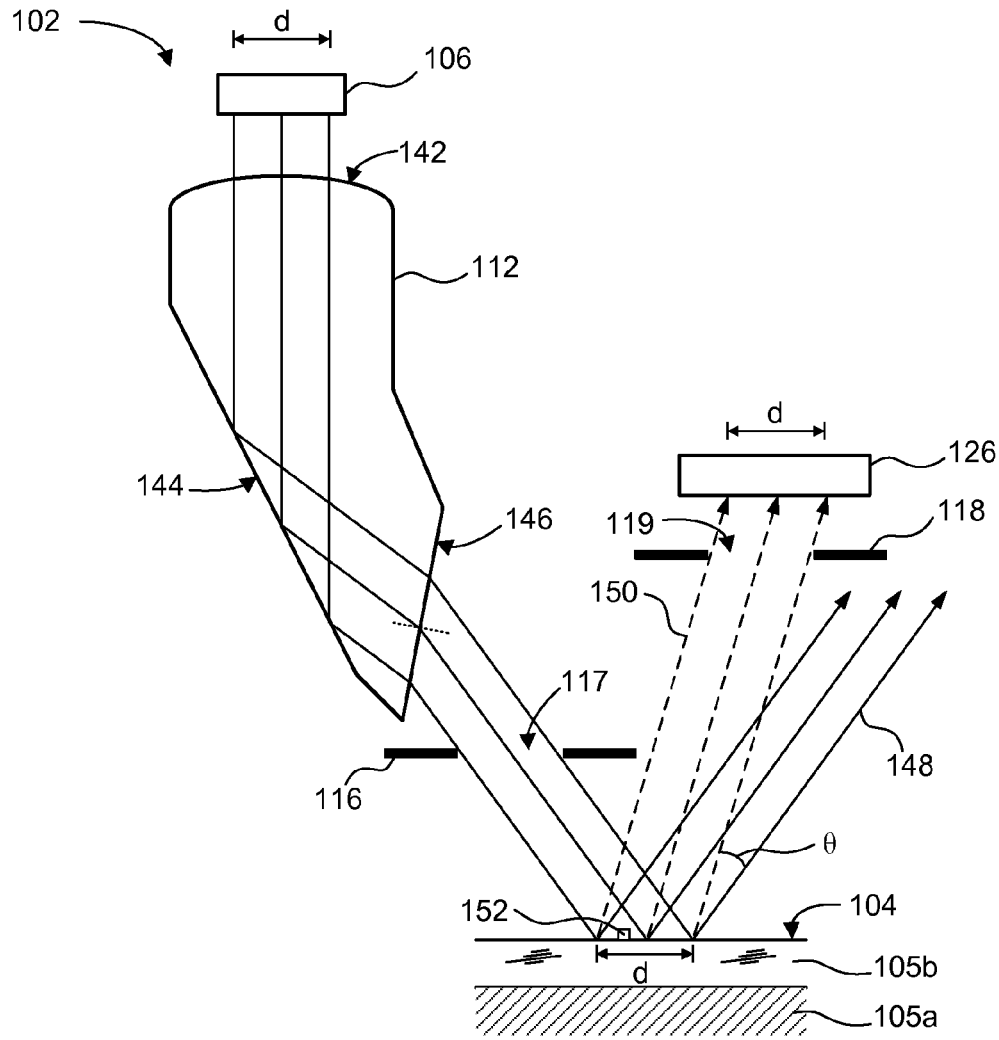
FIG. 3 depicts a schematic diagram of another embodiment of the optical navigation input device of FIG. 2.

FIG. 3 depicts a schematic diagram of another embodiment of the optical navigation input device 102 of FIG. 2. The illustrated embodiment includes the light source 106, the optical element 112, the illumination aperture structure 116 which defines the illumination aperture 117, the imaging aperture structure 118 which defines the imaging aperture 119, and the image sensor 126. The optical navigation input device 102 is shown relative to the illumination surface 104, which in this example includes an opaque material 105*a* covered by a glass material 105*b*. Although the optical navigation input device 102 is shown and described with certain components and functionality, other embodiments of the optical navigation input device 102 may include fewer or more components to implement less or more functionality.

The illustrated optical element 112 includes a light input interface 142, a reflective surface 144, and a refraction interface 146. In some embodiments, the light input interface 142 receives light from the light source 106 into the optical element 112. In some embodiments, the light input interface 142 collimates the light from the light source 106. The light input interface 142 directs the light toward the reflective surface 144 in the optical element 112.

The reflective surface 144 is oriented at an angle with respect to the path of the light within the optical element 112. In some embodiments, the reflective surface 144 is polished to further facilitate total internal reflection (TIR) of the light within the optical element 112. In other embodiments, a reflective coating is applied to the reflective surface through chemical deposition, adhesion, diffusion or other forms of material application. The reflective surface 144 is oriented to facilitate total internal reflection (TIR) of the light within the optical element 112. The reflective surface 144 directs the light to the refraction interface 146.

Figure 3A:
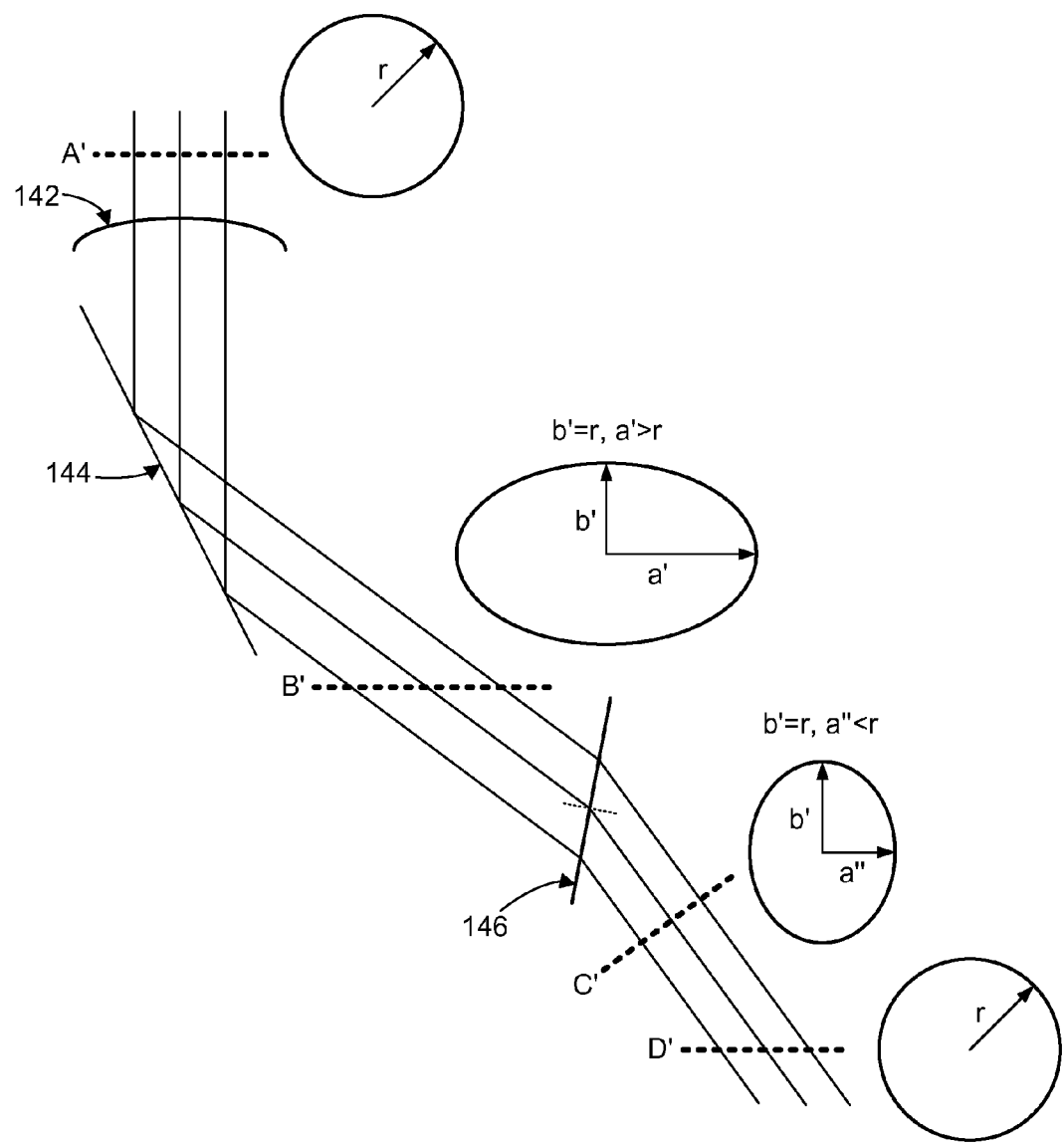
FIG. 3A shows one example of a relationship between circular and elliptical cross sections and projections of the incident light beam as the light beam is reflected and refracted by the optical element of FIG. 3.

In some embodiments, the refraction interface 146 has a planar geometry. The refraction interface 146 may be polished to improve optical transmission of the emergent light. The refraction interface 146 directs the light out of the optical element 112 to an illumination aperture structure 116. The refraction interface 146 may further collimate the light as it passes through the refraction interface 146. In some embodiments, the refraction interface 146 modifies the cross-sectional geometry of the light beam to illuminate a geometrical area on the navigation surface 104. For example, a light beam having a circular or elliptical cross section may reflect from the reflective surface 144 toward the refraction interface 146, and the refraction interface 146 changes the circular or elliptical shape of the cross section in, at least one direction, as the refraction interface 146 refracts the light beam toward the illumination surface 104. A specific example of how the refraction interface 146 may modify the cross-sectional geometry of the light beam is shown in FIG. 3A and described in more detail below. In some embodiments, the refraction interface 146 may include an optical aperture (not shown) disposed on the surface of the refraction interface 146 to further modify the light beam as it is directed from the optical element 112 to the illumination aperture structure 116.

In some embodiments, the illumination aperture structure 116 is between the optical element 112 and the illumination surface 104. The illumination aperture structure 116 defines an illumination aperture 117. More specifically, the illumination aperture structure 116 defines a two-dimensional shape of the illumination aperture 117. In some embodiments, the particular shape of the cross-section of the incident light beam is elliptical at the illumination aperture 117, and the particular shape of the projection (i.e., taken along a plane substantially parallel to the illumination surface 104) of the refracted light beam is circular (refer to FIG. 3A). Other embodiments of the illumination aperture 117 may provide an aperture with other cross-sectional geometries.

In some embodiments, the optical element 112 is located at approximately a distance of 0.5 mm from the illumination aperture structure 116. Other embodiments of the optical element 112 may be located closer to or further away from the illumination aperture structure 116.

In general, light incident on the illumination surface 104 is reflected away from the illumination surface 104 along a specular reflection path 148. However, at least some of the light incident on the illumination surface 104 is scattered along a scattered light path 150 by a surface feature 152 on the illumination surface 104. In some embodiments, the surface feature 152 is a scratch on the illumination surface 104. In another embodiment, the surface feature 152 is a dust particle. In other embodiments, the surface feature 152 is another type of non-uniformity on the illumination surface 104. The scattered light travels along the scattered light path 150 and may travel in other directions as well. Light which travels along the scattered light path 150 passes through the imaging aperture 119 defined by the imaging aperture structure 118. For example, if the illumination surface 104 is glass, small surface scratches or particles of dust may scatter light along the scattered light path 150 to impinge on the image sensor 126 instead of allowing all of the light to be reflected along the specular reflection path 148.

In some embodiments, the imaging aperture structure 118 is between the illumination surface 104 and the image sensor 126. The imaging aperture structure 118 is oriented substantially parallel to the illumination surface 104. In some embodiments, the imaging aperture structure 118 is oriented at a non-zero angle with respect to the illumination surface 104. In some embodiments, the imaging aperture structure 118 defines a circular imaging aperture 119. In another embodiment, the imaging aperture structure 118 may form the imaging aperture 119 with a shape to match a geometry of the image sensor 126. In other embodiments, the imaging aperture structure 118 defines another shape in the imaging aperture 119.

In some embodiments, the imaging aperture structure 118 blocks the light along the specular reflection path 148 and removes undesired stray light contributions from the light on the scattered light path 150. At least some of the light that passes through the imaging aperture 119 impinges on the image sensor 126. The image sensor 126 detects the light passed by the imaging aperture 119.

FIG. 3A shows one example of a relationship between circular and elliptical cross sections and projections of the incident light beam as the light beam is reflected and refracted by the optical element 112 of FIG. 3. Although the optical element 112 is not shown in its entirety, the pertinent portions of the optical element 112 are identified as they relate to the path of the light from the light source 106 to the illumination surface 104 (refer to FIG. 3). In particular, FIG. 3A depicts the light input interface 142, the reflective surface 144, and the refraction interface 146 of the optical element 112.

As the light beam enters the optical element 112 through the light input interface 142, the light beam may have a substantially circular cross section indicated at plane A'. However, in some embodiments, the light beam may have a non-circular cross section. As shown in FIG. 3A, the circular cross section has a constant radius, r. In one embodiment, the light source 106 may generate the light beam with a circular cross section. Alternatively, the light input interface 142 may produce the circular cross section as the light beam passes through the light input interface 142 in to the optical element 112.

As the light beam passes through the optical element 112, the reflective surface 144 reflects the light beam, for example, through total internal reflection (TIR) toward the refraction interface 146. Depending on the angle of the reflective surface 144 relative to the incoming light beam and the illumination surface 104, the reflective surface 144 alters the direction of travel of the light beam. As shown in FIG. 3A, the angled projection of the light beam taken at plane B' is elliptical. The elliptical projection of the light beam at plane B' has two dimensions, a' and b', where b' is equal to r, and a' is greater than r because the angle at which the reflective surface 144 reflects the light beam tends to stretch out the light beam in the a' direction within plane B'. For reference, the a' direction corresponds to the left-right direction on the page, and the b' direction corresponds to the in-out direction on the page.

As the light passes through the refraction interface 146, the refraction interface 146 modifies the cross section of the light beam so that the cross section of the light beam is different as the light beam exits the optical element 112 compared with the cross section of the light beam before reaching the refraction interface 146. Specifically, the cross section taken at plane C' indicates the cross section of the light beam after it exits the optical element 112 through the refraction interface 146. The cross section of the light beam at plane C' has a dimension, a'', which is smaller than the radius, r, of the original cross section of the light beam. The b' dimension remains constant and equal to the radius, r.

By decreasing the a'' dimension of the cross section, the resulting projection of the light taken at plane D' is circular, with the same original radius, r. Alternatively, it may be possible to change the overall size of the illuminated spot (e.g., through optical magnification techniques) while retaining the same cross-sectional geometry (e.g., a circle) as the final shape taken at plane D'. In any case, the described embodiment allows the resulting light beam to have an angled projection taken along plane D' that is similar to or the same as the cross-sectional geometry of the light beam taken along plane A', even thought the projection at plane D' is angled relative to the direction of the light beam.

Since the projected geometry of the light beam at plane D' is the same as the cross-sectional geometry of the light beam at plane A', embodiments of the optical navigation input device 102 may be manufactured and assembled more easily and more affordable. In particular, the aperture structures 116 and 118 and the image sensor 126 may be arranged horizontally, instead of at an angle, within the optical navigation input device 102. As a result, the size of the optical navigation input device 102 may be reduced, because the aperture structures 116 and 118 and the image sensor 126 may be placed closed to other components within the optical navigation input device 102. Other embodiments may present additional benefits over conventional technology.

Figure 4:
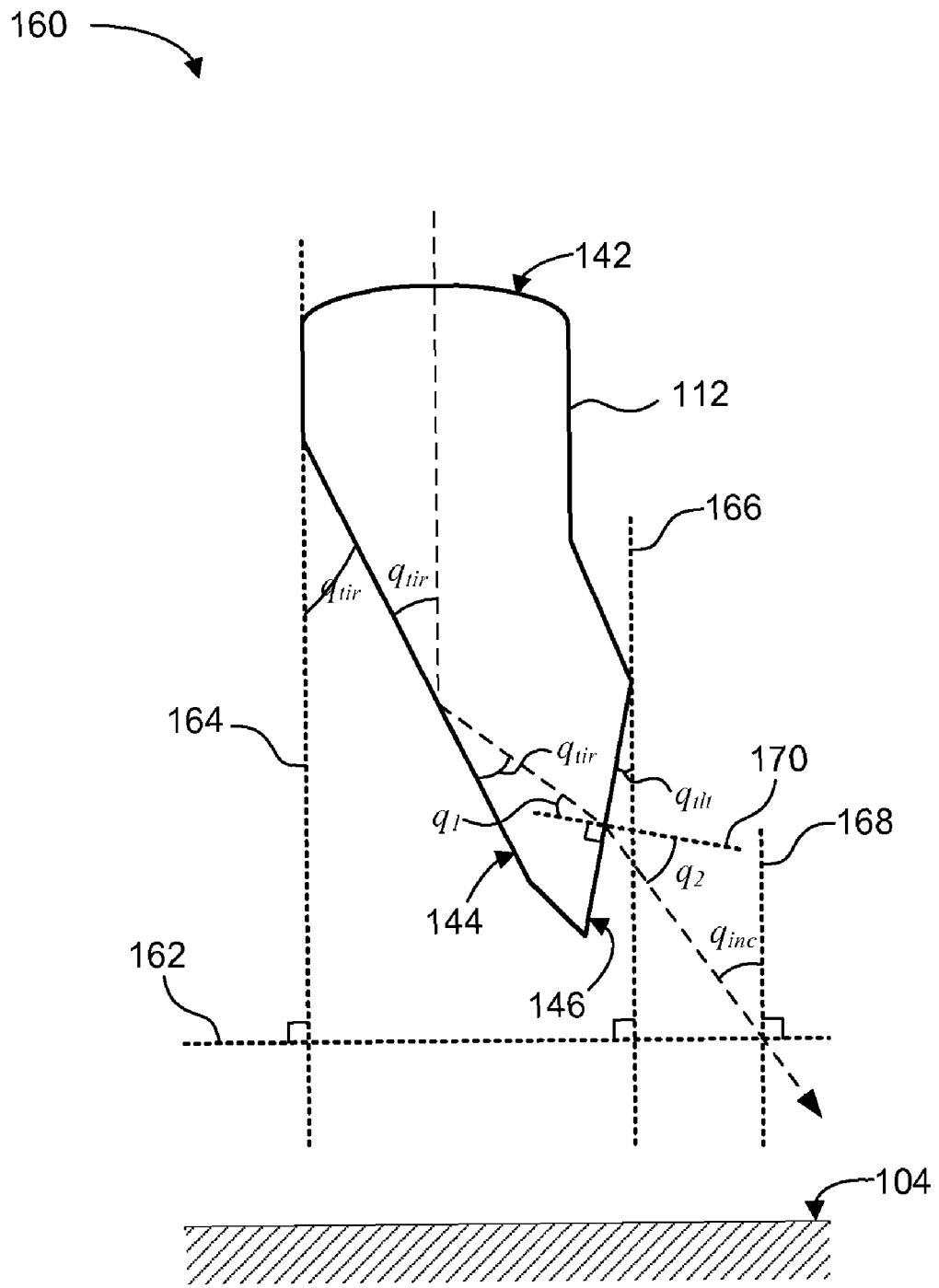
FIG. 4 depicts a schematic diagram of one embodiment of the optical element of FIG. 3 relative to the illumination surface.

FIG. 4 depicts a schematic diagram of one embodiment of the optical element 112 of FIG. 3 relative to the illumination surface 104. For reference in describing the optical element 112, the optical element 112 is shown relative to a reference plane 162. In the illustrated embodiment, the reference plane 162 is parallel to the illumination surface 104. Additionally, several surface normals 164, 166, and 168 are shown. Each surface normal 164, 166, and 168 is perpendicular, or normal, to the reference plane 162. The optical element 112 includes the light input interface 142 to receive light into the optical element 112. The optical element 112 also includes a reflection surface 144. In the illustrated embodiment, the reflection surface 144 is oriented at an angle of $q_{nr}$ with respect to the surface normal 164. The angle $q_{nr}$ of the reflection surface 144 facilitates an identical angle $q_{nr}$ in the reflection path of the light with respect to the reflection surface 144.

The refraction interface 146 is oriented at an angle, $q_{tlt}$, with respect to the surface normal 166. The light is directed to the refraction interface 146 with an approach angle of $q_1$ with respect to the refraction interface normal 170, which is normal or perpendicular to the refraction interface 146. The light is directed from the refraction interface 146 at an angle of $q_2$ with respect to the refraction interface normal 170. The light travels at an angle, $q_{inc}$, with respect to the surface normal 168.

Although there may be several different embodiments, the relationships of $q_1$, $q_2$, $q_{tlt}$, and $q_{inc}$ are detailed for a specific embodiment in the following equations:

$$2q_{tir}+q_1+q_{tlt}=90°$$

$$q_{inc}+q_2+q_{tlt}=90°$$

In one embodiment, the first angle, $q_{tir}$, of the reflection surface 144 is between about 25 to 29 degrees, and the second angle, $q_{tlt}$, of the refraction interface 146 is between about 9 to 12 degrees. Other embodiments include other angles. For example, for $q_{inc}$ between about 30-40 degrees, $q_{tir}$ varies between about 22-30 degrees and $q_{tlt}$ varies between about 23-3 degrees.

The ratio of the index of refraction, η, of the material of the optical element 112, and the index of refraction, $η_{air}$, of the air is described by the equation:

$$\frac{\sin(q_1)}{\sin(q_2)} = \frac{\eta_{air}}{\eta}$$

In the embodiment of FIG. 4, the angle $q_1$ is 25.9 and the angle $q_2$ is 43.3, using a material index η of 1.57, assuming air index $η_{air}$ to be equal to 1. Other embodiments may use other angles and/or indices of refraction. For example, for $q_{inc}$ between about 30-40 degrees, $q_1$ varies between about 22-28 degrees and $q_2$ varies between about 36-48 degrees.

Figure 5:
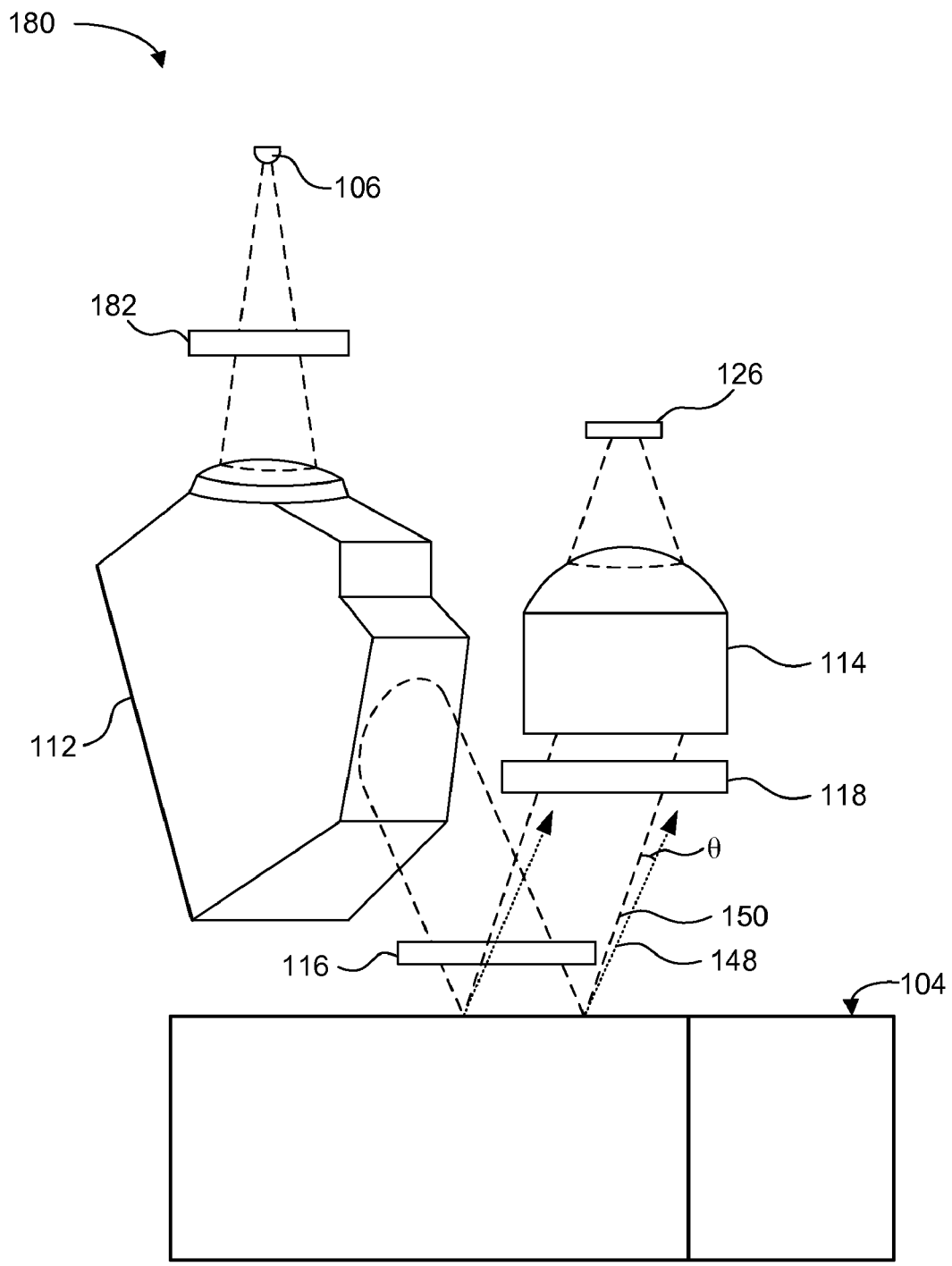
FIG. 5 depicts a perspective view of another embodiment of the optical navigation input device of FIG. 2.

FIG. 5 depicts a perspective view of another embodiment of the optical navigation input device of FIG. 2. The illustrated optical navigation input device 180 includes the light source 106, the optical element 112, the illumination aperture structure 116, the imaging aperture structure 118, the imaging lens 114, and the image sensor 126. Other embodiments may include fewer or more components to implement less or more functionality.

The light source 106 emits light, which passes through an aperture 182 and enters the optical element 112. In particular, the light enters the optical element 112 through the light input interface 142. The optical element 112 directs the light towards the illumination aperture structure 116. The illumination aperture structure 116 may remove aberrations at the periphery of the light. The light impinges on the illumination surface 104, and some of the light is reflected by the illumination surface 104 along the specular reflection path 148. Some of the light that impinges on the illumination surface 104 is scattered by the surface feature 152 or other imperfections, scratches, particles, or non-uniform aspects on the illumination surface 104. Hence, some of the scattered light travels along the scattered light path 150, which is separated from the specularly reflected light by an angle of θ. Some of the scattered light passes through the imaging aperture 119 (not shown) of the imaging aperture structure 118 and is incident on the imaging lens 114. The imaging lens 114 directs the scattered light to the image sensor 126. As described above, the image sensor 126 generates navigation images to detect a navigation direction and signal.

Figure 1:
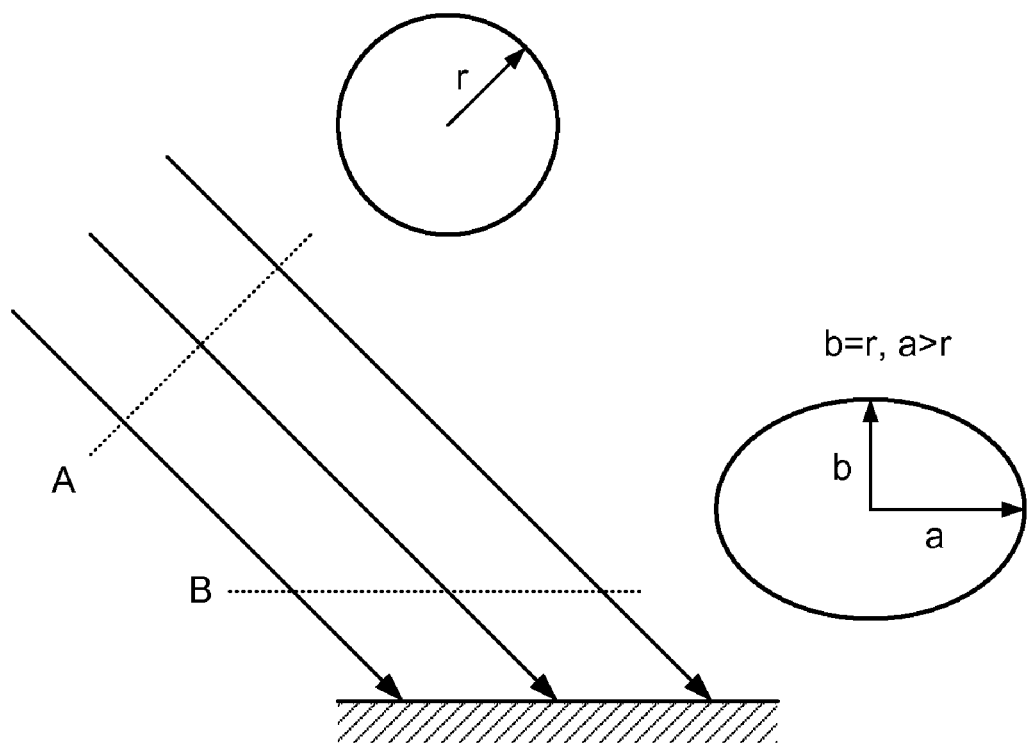
FIG. 1 shows one example of a relationship between the circular cross section of the incident light beam and the elliptical shape of the illuminated spot on the navigation surface.
Figure 6:
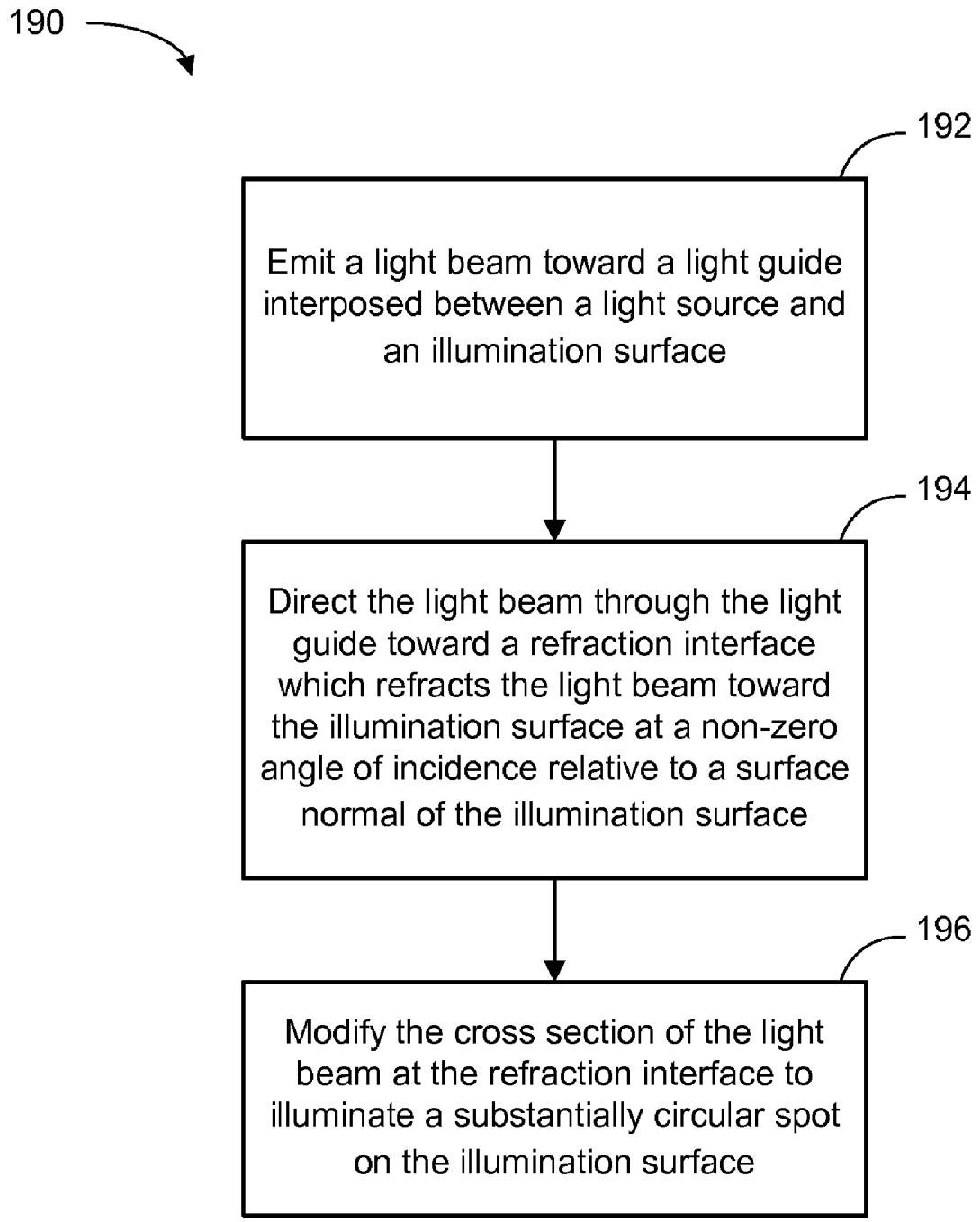
FIG. 6 depicts a flow chart diagram of one embodiment of a method for operating the optical navigation input device of FIG. 2.

FIG. 6 depicts a block diagram of one embodiment of a method 190 for operating an optical navigation input device 102. Although the method 190 is described in conjunction with the optical navigation input device 102 of FIG. 1, the method 190 may be implemented with other types of optical navigation input devices.

At block 192, the light source 106 emits a light beam. In some embodiments, the light beam has a substantially circular cross section. In other embodiments, the light beam has a substantially elliptical cross section. The light beam is directed toward the light guide 112 interposed between the light source 106 and the illumination surface 104. At block 194, the light beam enters the light guide 112, which directs the light beam toward the refraction interface 144. The refraction interface 144 refracts the light toward the illumination surface 104 at a non-zero angle of incidence relative to a surface normal of the illumination surface 104. At block 196, the refraction interface 144 modifies the cross section of the light beam to illuminate a substantially circular spot on the illumination surface 104. The depicted method 190 then ends.

In the above description, specific details of various embodiments are provided. In some embodiments, the use of a light beam with a circular projection in a plane parallel to the illumination surface facilitates mounting the aperture structures 116 and 118 horizontally relative to the reference plane 162 which facilitates packaging and placement of the aperture structures 116 and 118. Some embodiments of the optical navigation input device 102 facilitate substantial reduction in navigation signal noise through reduction of multiple reflections between the light input interface 142 and the refraction interface 146.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An optical navigation input device comprising:
   a light source to emit a light beam having a substantially elliptical or substantially circular cross section; and
   a light guide positioned relative to the light source to receive the light beam from the light source in a first direction and to redirect the light beam in a second direction toward an illumination surface at a non-zero angle of incidence, wherein the light guide is configured to direct the light beam through a refraction interface configured to illuminate a substantially circular area on the illumination surface, wherein the light guide comprises:
      a light input interface to receive the light beam from the light source; and
      a reflection surface to internally reflect the light beam according to total internal reflection (TIR) toward the refraction interface, wherein the reflection surface comprises a first planar surface at a first angle, $q_{tir}$, relative to a surface normal of the illumination surface;
   wherein the refraction interface comprises a second planar surface at a second angle, $q_{tlt}$, relative to the surface normal of the illumination surface;
   wherein the first angle, $q_{tir}$, of the reflection surface is between about 22 to 30 degrees, and the second angle, $q_{tlt}$, of the refraction interface is between about 23 to 3 degrees.

2. The optical navigation input device of claim 1, wherein the light input interface of the light guide is located on a top surface of the light guide to receive the light beam from the light source in a substantially vertical direction.

3. The optical navigation input device of claim 1, wherein the light input interface of the light guide comprises a collimating lens to collimate the light beam from the light source.

4. The optical navigation input device of claim 1, further comprising an illumination aperture structure interposed between the light guide and the illumination surface, wherein the illumination aperture structure is oriented substantially parallel to the illumination surface, wherein the illumination aperture structure defines a substantially circular illumination aperture to pass at least a portion of the light beam to the illumination surface.

5. The optical navigation input device of claim 1, further comprising an image sensor to receive reflected light from the illumination surface and to generate a navigation image based on the reflected light, wherein the image sensor comprises a pixel array oriented substantially parallel to the illumination surface.

6. The optical navigation input device of claim 5, wherein the image sensor is positioned to receive scattered light from a surface feature at the illumination surface, wherein the scattered light travels along a scattered light path which is offset from a specular reflection path.

7. The optical navigation input device of claim 6, further comprising an imaging aperture structure interposed between the illumination surface and the image sensor, wherein the imaging aperture structure is oriented substantially parallel to the illumination surface, wherein the imaging aperture structure defines a substantially circular imaging aperture to pass at least a portion of the scattered light to the image sensor.

8. The optical navigation input device of claim 7, further comprising an imaging lens structure disposed within the scattered light path of the scattered light and interposed between the imaging aperture and the image sensor, wherein the imaging lens structure comprises at least one optical element to direct the scattered light to the image sensor.

9. A light guide for an optical navigation input device, the light guide comprising:
   a light input interface to receive an incident light beam from a light source in a first direction, wherein the incident light beam has a substantially elliptical or substantially circular cross section taken along a plane substantially perpendicular to the first direction;
   a reflection surface to internally reflect the incident light beam from the first direction to an intermediate direction within the light guide; and
   a refraction interface to receive the reflected light beam from the reflection surface and to refract the light beam out of the light guide in a second direction at a non-zero angle of incidence relative to a surface normal of a reference plane, wherein an angled projection, taken along a plane substantially parallel to the reference plane, of the refracted light beam has the same shape as the cross section of the incident light beam;
   wherein the reflection surface is further configured to reflect the incident light beam according to total internal reflection (TIR) toward the refraction interface, wherein the reflection surface comprises a planar surface at an angle, $q_{tir}$, relative to the surface normal of the reference plane;

wherein the angle, $q_{tir}$, of the planar surface of the reflective surface relative to the surface normal of the reference plane is between about 22 to 30 degrees.

10. The light guide of claim 9, wherein the refraction interface comprises a planar surface at an angle, $q_{tlt}$, relative to the surface normal of the reference plane.

11. The light guide of claim 10, wherein the angle, $q_{tlt}$, of the planar surface of the refraction interface relative to the surface normal of the reference plane is between about 3 to 23 degrees.

12. The light guide of claim 9, wherein the light input interface comprises a collimating lens to collimate the incident light beam from the light source.

13. A light guide for an optical navigation input device, the light guide comprising:

a light input interface to receive an incident light beam from a light source in a first direction, wherein the incident light beam has a substantially elliptical or substantially circular cross section taken along a plane substantially perpendicular to the first direction;

a reflection surface to internally reflect the incident light beam from the first direction to an intermediate direction within the light guide; and a refraction interface to receive the reflected light beam from the reflection surface and to refract the light beam out of the light guide in a second direction at a non-zero angle of incidence relative to a surface normal of a reference plane, wherein an angled projection, taken along a plane substantially parallel to the reference plane, of the refracted light beam has the same shape as the cross section of the incident light beam;

wherein the refraction interface comprises a planar surface at an angle, $q_{tlt}$, relative to the surface normal of the reference plane;

wherein the angle, $q_{tlt}$, of the planar surface of the refraction interface relative to the surface normal of the reference plane is between about 3 to 23 degrees.

14. The light guide of claim 13, wherein the light input interface comprises a collimating lens to collimate the incident light beam from the light source.

* * * * *